(12) United States Patent
Powell et al.

(10) Patent No.: US 12,719,147 B1
(45) Date of Patent: Aug. 25, 2026

(54) UNIVERSAL MOUNT FOR AN ACCESS POINT OR ANTENNA

(71) Applicant: Hubbell Incorporated, Shelton, CT (US)

(72) Inventors: Stephen Powell, Baltimore, MD (US); Tim Ortel, Monkton, MD (US); Christopher Jufer, Felton, PA (US)

(73) Assignee: Hubbell Incorporated (Delaware), Shelton, CT (US)

( * ) Notice: Subject to any disclaimer, the term of this patent is extended or adjusted under 35 U.S.C. 154(b) by 0 days.

(21) Appl. No.: 18/644,884

(22) Filed: Apr. 24, 2024

Related U.S. Application Data

(60) Provisional application No. 63/462,098, filed on Apr. 26, 2023.

(51) Int. Cl.
*H01Q 1/12* (2006.01)
*F16C 11/06* (2006.01)
*F16M 13/02* (2006.01)

(52) U.S. Cl.
CPC .......... *H01Q 1/1264* (2013.01); *F16C 11/06* (2013.01); *F16M 13/027* (2013.01)

(58) Field of Classification Search
CPC ..... H01Q 1/1264; F16C 11/06; F16M 13/027; F16M 11/14
USPC ...................... 248/214, 300, 343, 663, 481, 248/181.1–181.2, 288.31, 314
See application file for complete search history.

(56) References Cited

U.S. PATENT DOCUMENTS

| | | | | |
|---|---|---|---|---|
| 9,568,123 | B2 * | 2/2017 | Zhang | H02G 3/081 |
| 9,622,292 | B1 * | 4/2017 | Burrell | H05K 5/0204 |
| 9,714,529 | B1 * | 7/2017 | Conklin | H05K 5/0204 |
| 10,876,325 | B2 * | 12/2020 | Cheung | F16M 11/16 |
| 2006/0186301 | A1 * | 8/2006 | Dozier | F16M 11/24 248/371 |
| 2008/0061200 | A1 * | 3/2008 | Bouissiere | F16M 11/041 248/343 |
| 2011/0265393 | A1 * | 11/2011 | Mass | F16M 13/02 52/39 |
| 2014/0117186 | A1 * | 5/2014 | Govindasamy | F16M 11/16 248/317 |
| 2016/0014843 | A1 * | 1/2016 | Burrell | H04W 88/08 455/561 |
| 2019/0376320 | A1 * | 12/2019 | Cheung | F16M 11/22 |

* cited by examiner

*Primary Examiner* — Christopher Garft
(74) *Attorney, Agent, or Firm* — Robinson + Cole LLP

(57) ABSTRACT

A mount for an access point includes a plate having a front side and a back side; the plate including a number of patterns of holes for attaching the plate to a fixed structure; and a bar attached to the plate at a distance from the front face, the bar for attaching to an access point.

20 Claims, 13 Drawing Sheets

UNIVERSAL MOUNT FOR AN ACCESS POINT OR ANTENNA

FIELD OF THE INVENTION

The present invention is generally directed to an access mount and specifically to a universal mount for an access point or articulatable antenna.

BACKGROUND OF THE INVENTION

Access points which provide wireless coverage are typically mounted to walls and ceilings in a wide variety of locations from industrial settings to public areas such as the office workplace, educational institutions, stores, hotels, restaurants, and venues, etc. In public areas, the aesthetics and concealment of network equipment is more of a priority than in industrial settings.

Aside from simply mounting wireless equipment to drop ceiling grids and flat walls/ceilings, there are a variety of features in a building's construction that can be utilized for mounting. Outlet and junction boxes are found in every type of building, where ethernet and power can be routed behind walls and exit to an outlet or a junction box.

Some buildings may have an open ceiling where there are exposed systems and structures that can be more easily accessed. Commonly pipes, electrical wires, lights, HVAC ducting and equipment, etc. are suspended from the ceiling with lengths of all-thread rods. Another common feature is the use of hanging conduit, which can safely route wiring as well as suspend devices and lights.

In many makes of access points, a basic mounting bracket is not always included with an access point and must be purchased separately.

Access point mounting brackets, whether supplied or purchased separately, are typically a basic one that mounts to a drop ceiling T-bar and/or flat wall and it only works with the specific manufacturer's access point models. There are no aesthetically pleasing, compact solutions that can allow mounting via wall/ceiling, all-thread rods, conduit, junction, and outlet boxes, and provide articulation that can be used across several access point brands.

Similar to the case of access points mounting brackets, antenna brackets are typically limited in function as well and will attach to walls and poles in basic configurations. Specific configurations, such as the need to mount an individual articulatable antenna to drop ceiling T-bars and to hanging all-thread rods, are cases in which a typical antenna bracket will not be suited for.

SUMMARY OF THE INVENTION

The present invention provides a mount for an access point, comprising a plate having a front side and a back side; the plate including a number of patterns of holes for attaching the plate to a fixed structure; and a bar attached to the plate at a distance from the front face, the bar for attaching to an access point.

The present invention also provides a mount for a mount for attaching an access point, comprising a plate having a first pattern of holes for attaching to an electrical junction box, and a second pattern of holes for attaching to an electrical double gang outlet box and a third pattern of holes for attaching to an electrical single gang outlet box; and the first pattern defining a first rectangular perimeter and the second and third patterns of holes defining respective second and third rectangular perimeters disposed within the first rectangular perimeter.

The present invention further provides a mount for an access point, comprising a plate; a bar attached to a front side of the plate, the bar being spaced away from the front side; and an articulatable mount attached to a back side of the plate, the articulable mount including one end for being attached to a fixed structure.

The present invention also provides a mount for an antenna, comprising a plate; a T-bracket attached to a back side of the plate, the T-bracket having a fixed jaw and an adjustable jaw for grabbing a T-bar of a ceiling; and an articulatable mount attached to a front side of the plate, the articulatable mount including one end for being attached to an antenna.

DESCRIPTION OF THE INVENTION

Figure 1:
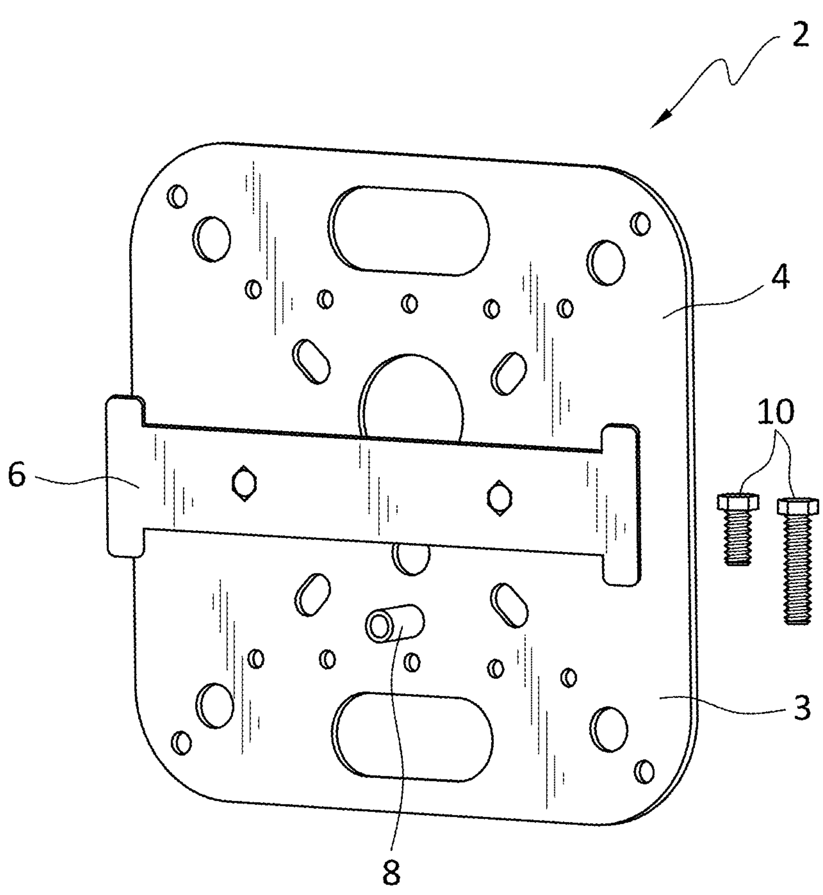
FIG. 1 is a perspective view of a mount assembly embodying the present invention.

Referring to FIG. 1, an access point (AP) mount assembly 2 embodying the present invention is disclosed. The assembly comprised of a backplate 4, preferably square and 6"×6", containing hole patterns for various mounting options, a T-bar assembly 6 to which an access point may be attached using a T-bar bracket (see FIG. 15). The backplate 4 has a planar front side 3 and a planar back side 5 (shown in FIG. 2). The backplate 4 contains a pressed-in threaded standoff 8 and hex bolts 10, which gives a user an option to adjust the access point to be parallel with the backplate 4 if there is any tilt in a wall mount position. The backplate 4 is shown with its front face. The backplate 4 may be made of metal or plastic.

Figure 2:
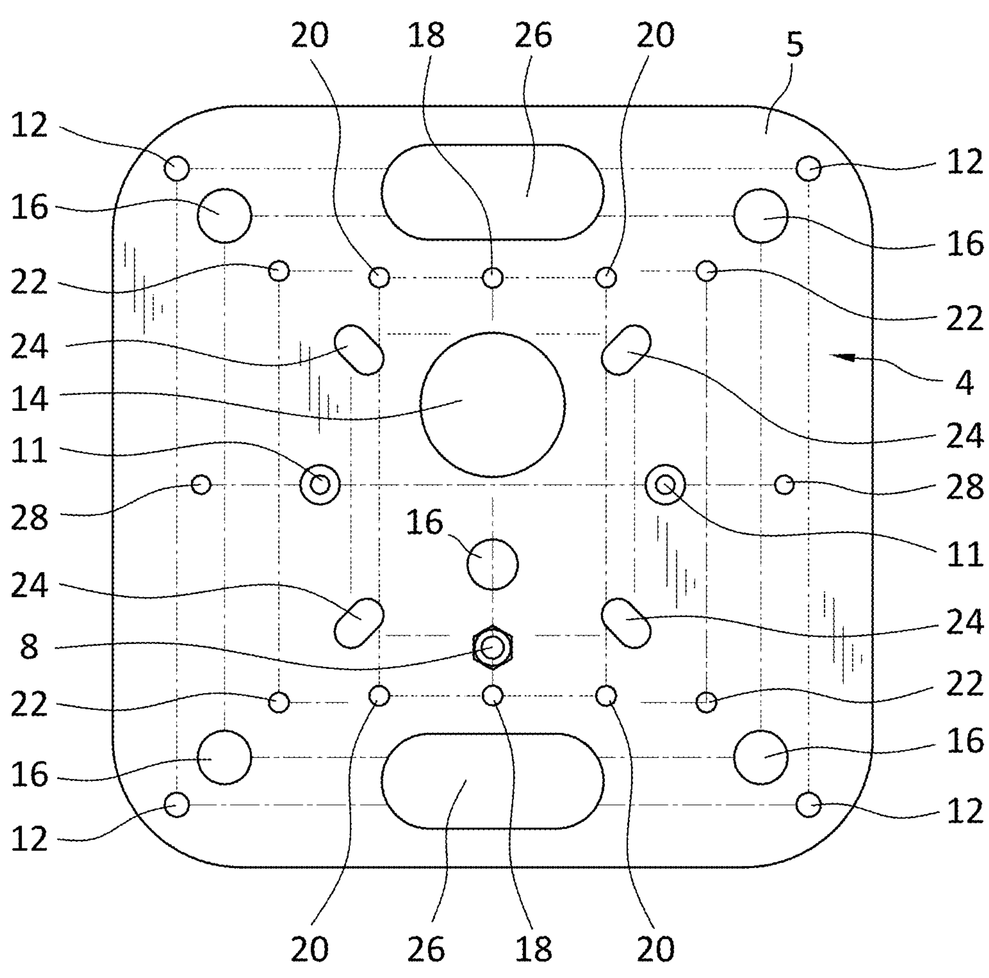
FIG. 2 is a plan view of the backplate of the assembly shown in FIG. 1.

Referring to FIG. 2, the backplate 4 is shown with various hole patterns which allow for mounting an access point in a variety of situations. A pattern is defined by dashed lines joining the first hole to the next hole and ending back at the first hole. The patterns include a single hole, a line, a square and a rectangular shape. Each pattern defines a perimeter. Each pattern is centered on the backplate 4, except for holes 14 and the interior hole 16. The center of the plate is where the dashed lines 18-18 and 28-28 intersect. Distances from the center to each of the holes in a pattern are equal. Centering the holes on the plate advantageously maximizes the available space on the plate. The backplate 4 is shown with its back side 5.

The mount's T-bar assembly 6 attaches to the backplate 4 on the opposite side (front side) via flat head screws installed through pattern of holes 11 which are preferably countersunk so there are no protruding screw heads, allowing the entire backplate 4 to lay flat against a ceiling or wall. The pattern of holes 11 is a straight line through the horizontal centerline of the backplate 4 as viewed on FIG. 2.

A press-in threaded standoff 8 (see FIG. 4) is inserted into the backplate 4 which is used with hex screws 10 to eliminate any tilt of the access point in a tilted position when installed vertically on a wall. The standoff 8 is disposed on a vertical centerline through the backplate 4 below the horizontal centerline.

Corner mounting pattern of holes 12 are provided to attach the mount assembly 2 to a flat wall or ceiling via screws. The pattern of holes 12 is preferably square and encompasses other hole patterns.

A conduit hole 14 is provided if a user desires to hang the access point from an electrical conduit. A conduit may be inserted through the hole 14 and fastened with a locknut. The hole 14 is disposed on the vertical centerline and above the horizontal centerline of the backplate 4.

A threaded rod hole 16 is provided on the vertical centerline, below the horizontal centerline but above the standoff 3. The hole 16 is near the center of the backplate 4 and is provided if a user desires to hang the access point from a length of all-thread rod. There are 4 more threaded rod holes 16 located in the corners, which allow the backplate to be hung by more than one length of all-thread rod. The pattern of holes 16 at the corners defines a square shape disposed within the area encompassed by the pattern of holes 12. The threaded rod may be inserted through each hole 16 and fastened with hex nuts.

Common electrical outlet and junction box hole patterns are included, such as single gang outlet box pattern of holes 18, double gang outlet box pattern of holes 20, and a junction box pattern of holes 22. The hole patterns correspond to the hole patterns of common electrical junction boxes and outlet boxes (both single and double gang). The single gang outlet pattern of holes 18 defines a straight line on the vertical centerline of the backplate 4. The double gang pattern of holes 20 defines a rectangular shape with the long sides of the rectangle disposed vertically on the backplate 4. The outlet box pattern of holes 22 defines a square shape. The top side and bottom side of the pattern of holes 20 and the top and bottom holes 18 are on the same respective lines of the pattern of holes 22.

It should be understood that the building walls, ceilings, electrical outlet boxes, junction boxes, hanging conduits, hanging threaded rods and I-beams are fixed structures to which the backplate 4 can be attached.

An accessory pattern of holes 24 is included to allow for the attachment of an accessory bracket and articulating mount, which will allow the entire mount 2 and the access point to be aimed. The pattern of holes 24 is preferably square in shape and is within the area of the pattern of holes 22. The pattern of holes 24 has a footprint smaller than the footprints of the patterns of holes 12, 16, 20, 22 so that these holes are not obscured when an attachment plate is attached to the backplate using the holes 24, allowing the use of the holes 12, 16, 20, 22 for their intended attachment purpose. Each of the holes 24 is slotted and oriented about 45° to provide a smaller or larger pattern to accommodate several sizes of attachment brackets.

Cable is passed through the pattern of slots 26 which are included in the backplate 4 to allow for ethernet cables, power cables, and antennas leads to be routed through the backplate 4 to the access point. The pattern of slots 26 is a straight line disposed on the vertical centerline. The slots 26 are disposed lengthwise horizontally.

T-bar bracket pattern of holes 28 in the backplate 4 are available for attaching the Ventev T-bar bracket, disclosed in U.S. Pat. No. 10,774,985, incorporated herein by reference, which will allow the mount 2 to hang from a drop ceiling T-bar in applications where an antenna is mounted to the mount (see FIG. 13). The pattern of holes 28 is a straight line coincident with the pattern of holes 12 and the centerline of the backplate 4.

Some of the pattern of holes, such the pattern of holes 12, 16, and 22 define rectangular nesting perimeters, a perimeter within another perimeter and within another perimeter.

Figure 3:
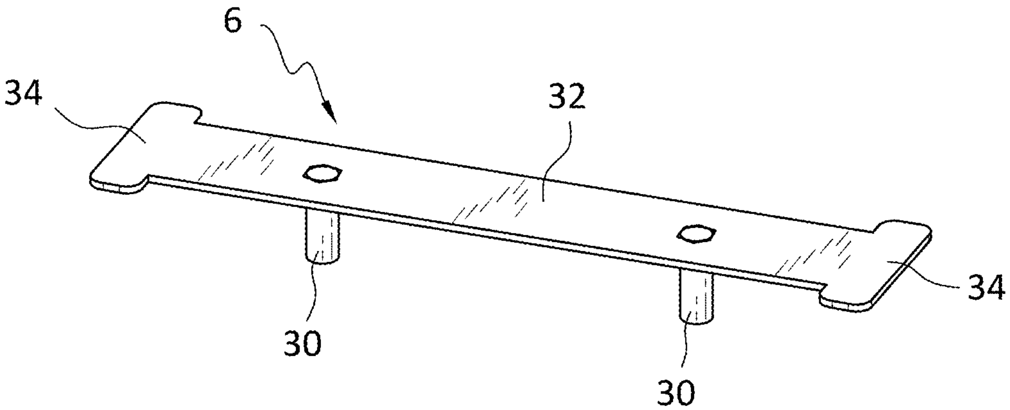
FIG. 3 is a perspective view of the I-bar assembly.

Referring to FIG. 3, the T-bar assembly 6 comprised of press-in threaded standoffs 30 inserted into a flat metal bar 32, which may be made of metal or plastic. The standoffs 30 locates the bar 32 at a distance from the front side of the backplate 4 and provides the top of the flat plate 32 to remain free of protruding screw heads. The bar 32 is advantageously 'I'-shaped where its ends 34 are wider than the longitudinal main portion of the bar to prevent an access point attached to a T-bar bracket from sliding off. The T-bar assembly 6 mounts to the backplate 4 via flathead screws which are inserted in the countersunk holes 12. The T-bar assembly 6 is advantageously removable from the backplate 4 in some use cases of the mount (see FIGS. 13 and 14).

Figure 4:
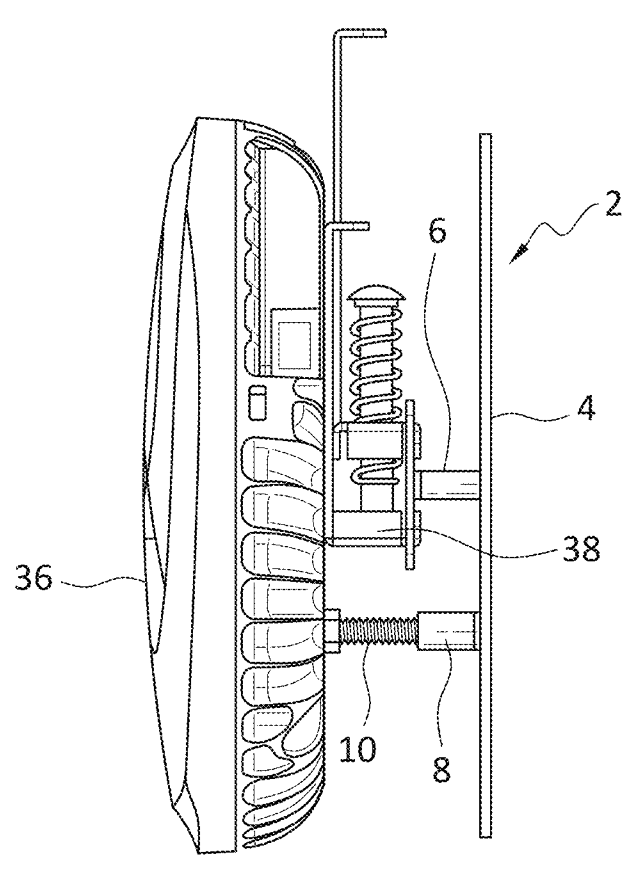
FIG. 4 is a side elevational view of the assembly shown in FIG. 1 in a wall-mounted position with an access point attached.

Referring to FIG. 4, an access point 36 in a wall mounted position (perpendicular to the floor) is mounted to the mount 2. The access point 36 includes a T-bar bracket 38, such as the Ventev T-bar bracket mentioned above, or any available T-bar bracket. The T-bracket 38 is removably attached to the T-bar assembly 6 of the mount 2. To eliminate any access point tilt caused by play between the T-bar bracket 38 and the T-bar assembly 6, a hex screw 10 can be threaded into the pressed in standoff 8 of the backplate 4. The hex screw 10 can be adjusted by hand or a wrench from the side to push the access point 36 into a position parallel with the backplate 4. The T-bar bracket is available from Ventev, SKU 278472, https://ventevinfra.com/product/wi-fi-t-bar-bracket-for-aruba-500-series-access-points/.

Figure 5:
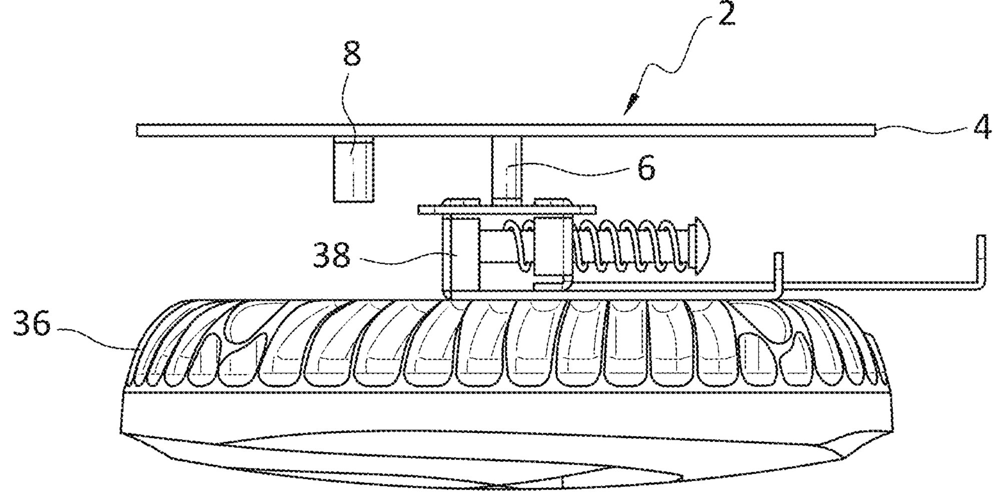
FIG. 5 is a side elevational view of the assembly shown in FIG. 1 in a hanging or ceiling-mounted position with an access point attached.

Referring to FIG. 5, the access point 36 is mounted to the mount 2 in a hanging/ceiling position (parallel to the ground). The access point 36 is attached to the Ventev T-bar bracket 38 as mentioned above, or any available T-bar bracket.

Figure 6:
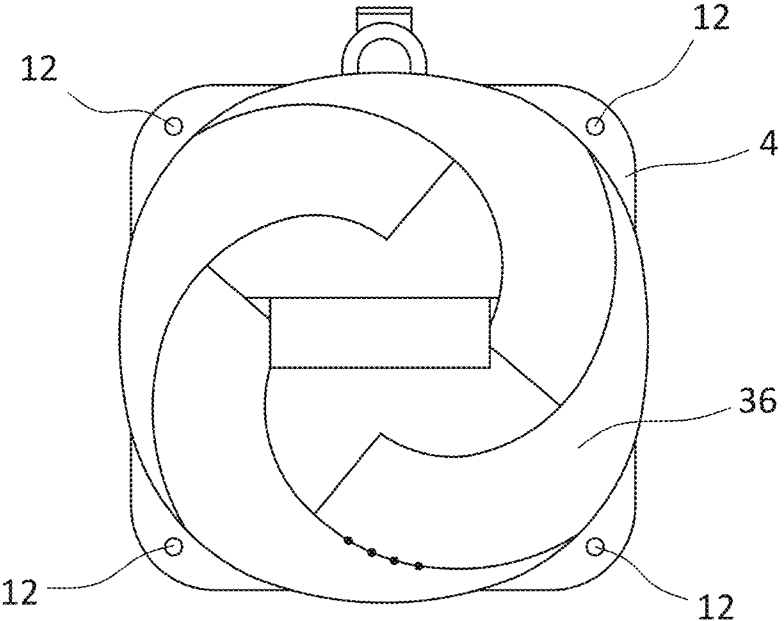
FIG. 6 is a top view of a small access point mounted to the mount shown in FIG. 1.

Referring to FIG. 6, a head-on view of a small (6.3"×6.3") access point 36 is shown mounted to the mount 2 (6"×6" footprint). The compact size of the mount 2 advantageously provides an aesthetic method of deploying the small access point. In larger size models of access points, the mount would be completely covered from a head-on view. Using the corner holes 12, the access point can be mounted with screws to flat surfaces such as walls and ceilings. Additionally, the corner holes 12 can be used to suspend the mount from a ceiling using hanger wire at each corner.

Figure 7:
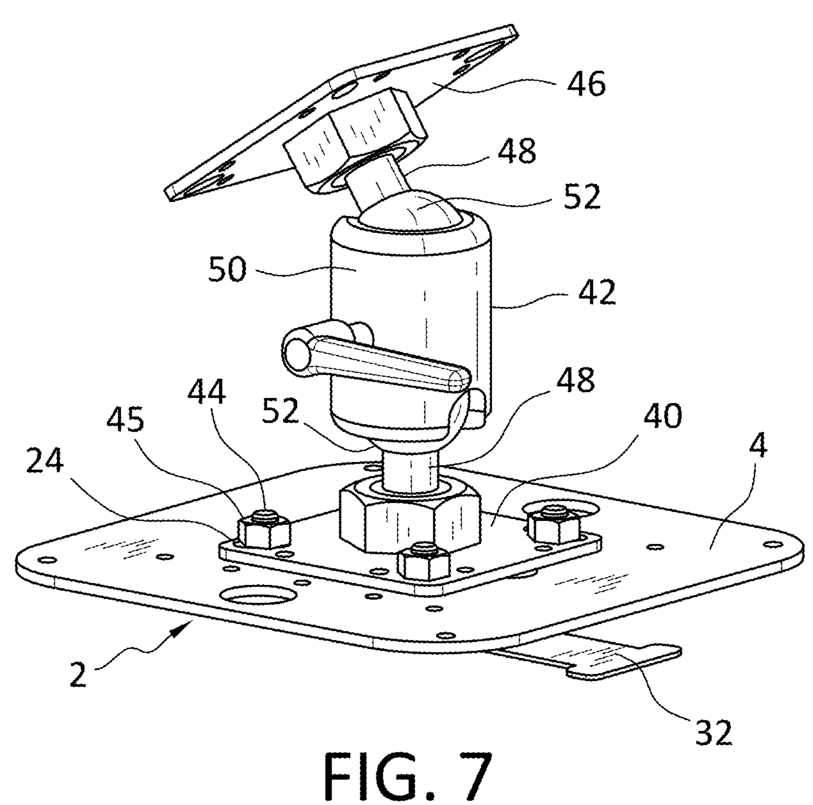
FIG. 7 is a perspective view of the mount with an articulating bracket and mount.

Referring to FIG. 7, the mount 2 may be fastened to an accessory bracket 40 and an articulating mount 42. The accessory bracket 40 has a set of holes that match the accessory pattern of holes 24 on the backplate 4 to attach via bolts 44 and hex nuts 45. On the opposite end of the articulating mount (21) is another accessory bracket 46, which may be a duplicate of the accessory bracket 40. The accessory bracket 46 may be attached to walls, ceilings, or other structures. By adjusting the position of the articulating mount 42, the entire mount 2 can be aimed as desired. The accessory pattern of holes 24 in the backplate 4 can also be used to mount to anything else with the matching holes. The articulating mount 42 has swivel arms 48 at each end for attachment of the accessory brackets 40 and 46. The swivel arms 48 are advantageously positionable within a cone when aiming an access point attached to the mount 2. The swivel arms 48 are connected to the body 50 of the mount with ball and socket joints 52 to provide the swivel motion within a cone and axial rotation of the arms 48.

Although the articulating mount 42 is shown with swivel arms at both ends, any articulating mount may be attached to the pattern of holes 24. The ball-and-socket type of articulating mount is just one example of a few articulating mounts available in the market. For example, an articulating universal joint style mount as shown at https://ventevinfra-.com/product/high-strength-universal-articulating-mount-and-mounting-bracket/with the matching hole pattern may be used with the backplate 4.

Figure 8:
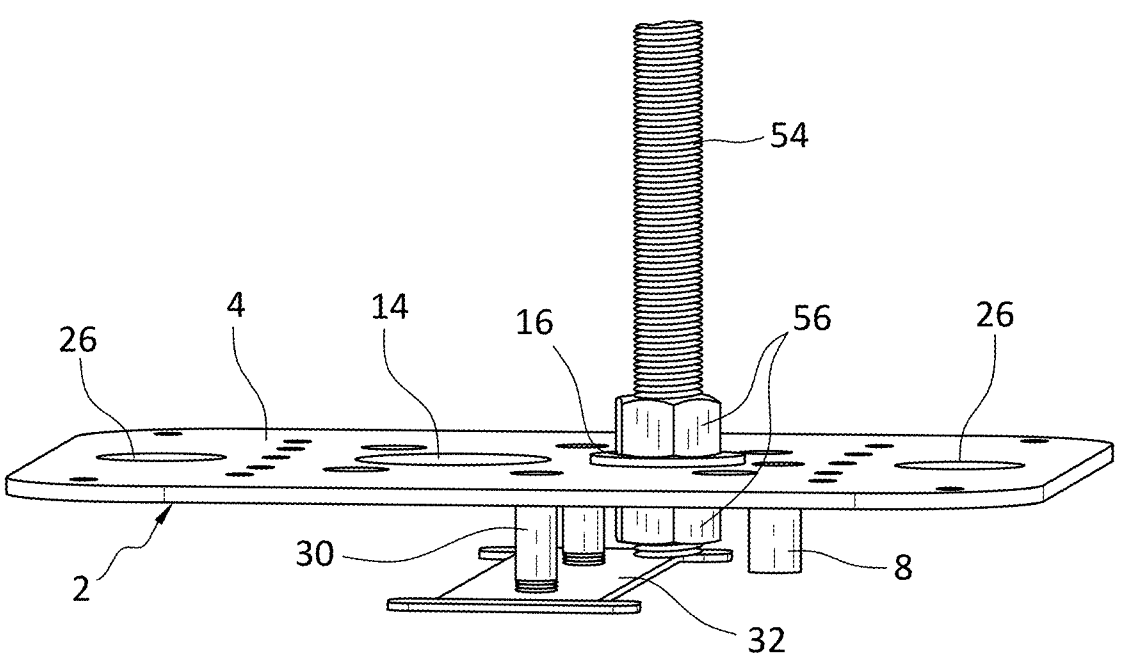
FIG. 8 is a perspective view of the mount shown in FIG. 1 attached to a hanging threaded rod.

Referring to FIG. 8, the mount may be fastened to a hanging threaded rod 54, which may be attached to a ceiling structure. The threaded rod 54 is passed through the hole 16 in the backplate 4 and fastened with hex nuts 56 on both sides of the backplate 4. The ethernet and power cables can be routed through the cable pass through slots 26 or the conduit hole 14 to an installed access point.

Figure 9:
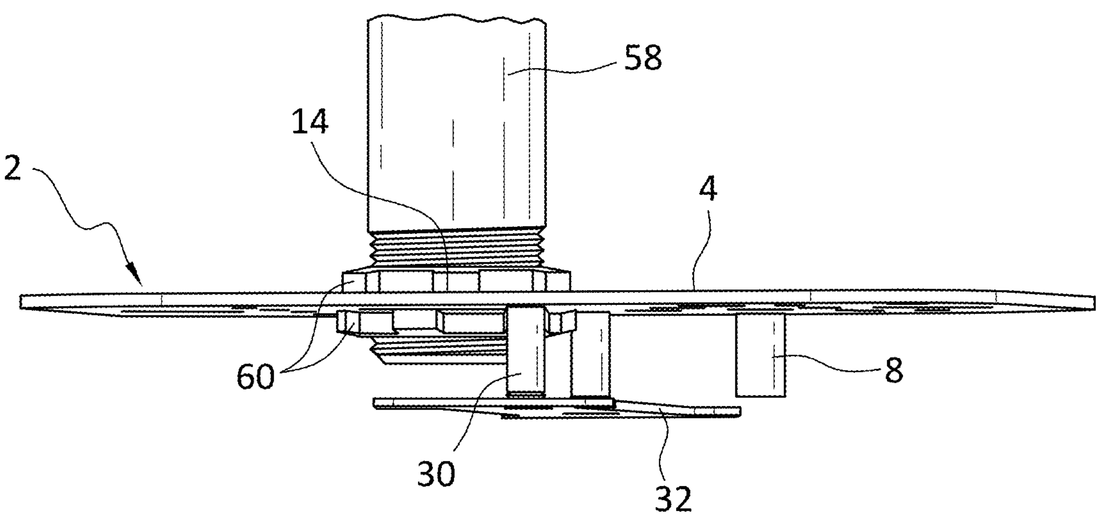
FIG. 9 is a perspective view of the mount shown in FIG. 1 attached to a hanging conduit.

Referring to FIG. 9, the mount 2 may be fastened to a length of hanging conduit 58. The conduit 58 is passed through the conduit hole 14 in the backplate 4 and is fastened with conduit locknuts 60. Ethernet and power cables can run through the conduit 58 to an installed access point.

Figure 10:
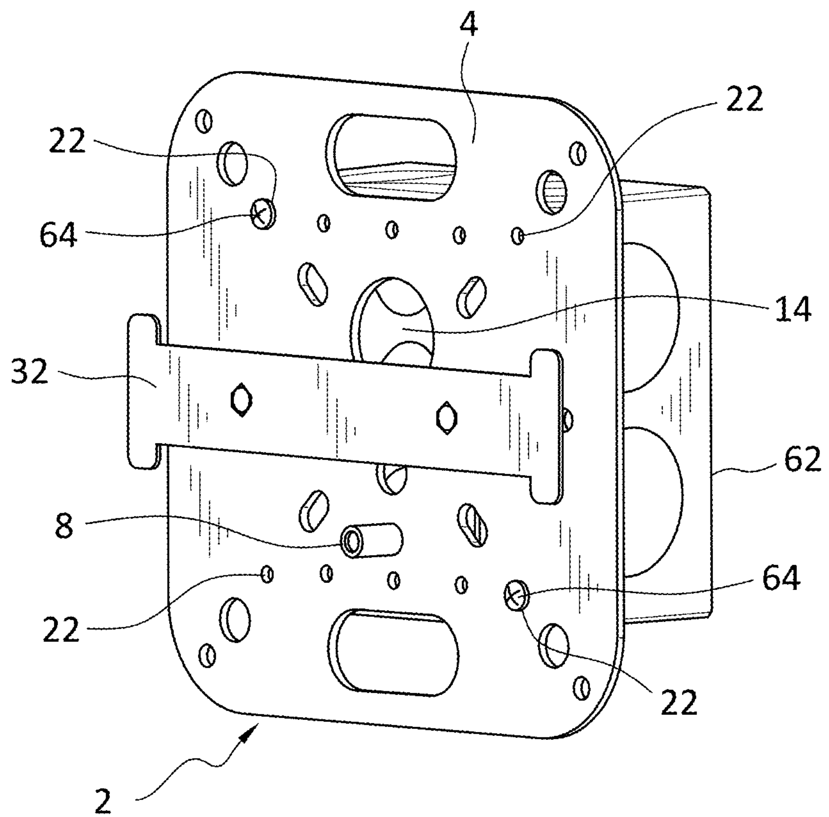
FIG. 10 is a perspective view of the mount shown in FIG. 1 attached to a junction box.

Referring to FIG. 10, the mount 2 may be fastened to an electrical junction box 62 using screws 64. The backplate 4 contains a pattern of holes 22 matching the standard hole pattern of an electrical junction box 62. On junction boxes, typically 2 screws 64) are used in a diagonal layout, but the mirrored diagonal pattern is also included on backplate 4 for more versatility. Ethernet and power cables can be routed though the junction box 62 and passed through the conduit hole 14.

Figure 11:
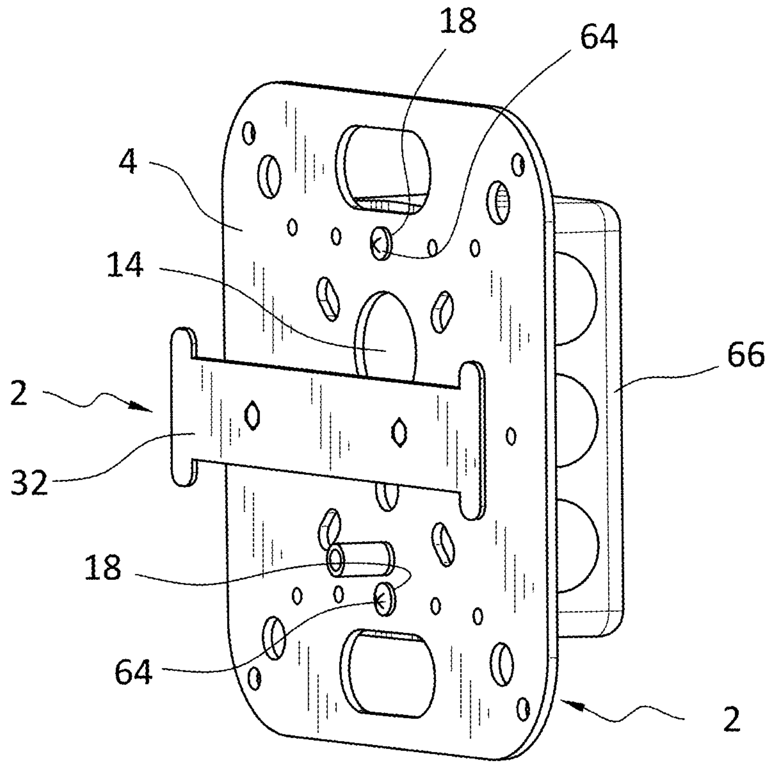
FIG. 11 is a perspective view of the mount shown in FIG. 1 attached to a single gang outlet box.

Referring to FIG. 11, the mount 2 may be fastened to a single gang outlet box 66 using screws 64. The backplate 4 contains a pattern of holes 18 matching the standard hole pattern of a single gang outlet box 66. Ethernet and power cables can be routed though the junction box 66 and passed through the conduit hole 14 to an installed access point.

Figure 12:
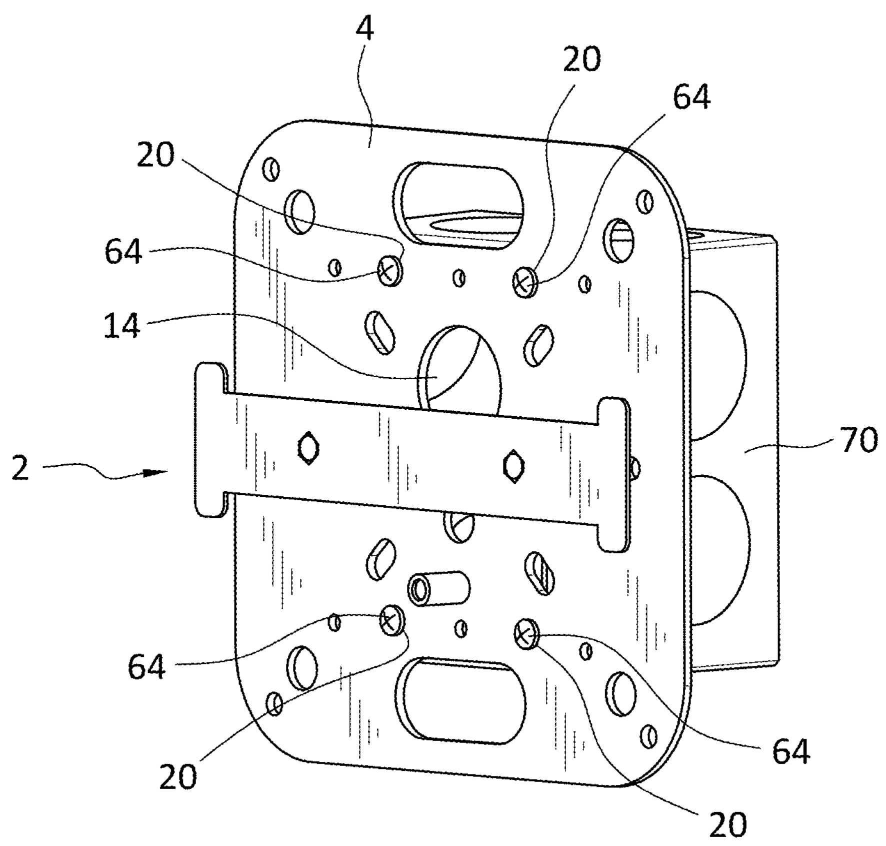
FIG. 12 is a perspective view of the mount shown in FIG. 1 attached to a double gang outlet box.

Referring to FIG. 12, the mount 2 may be fastened to a double gang outlet box 70 using screws 64. The backplate 4 contains a pattern of holes 20 matching the standard hole pattern of a double gang outlet box 70. Ethernet and power cables can be routed though the junction box 70 and passed through the conduit hole 14 to an installed access point.

Figure 13:
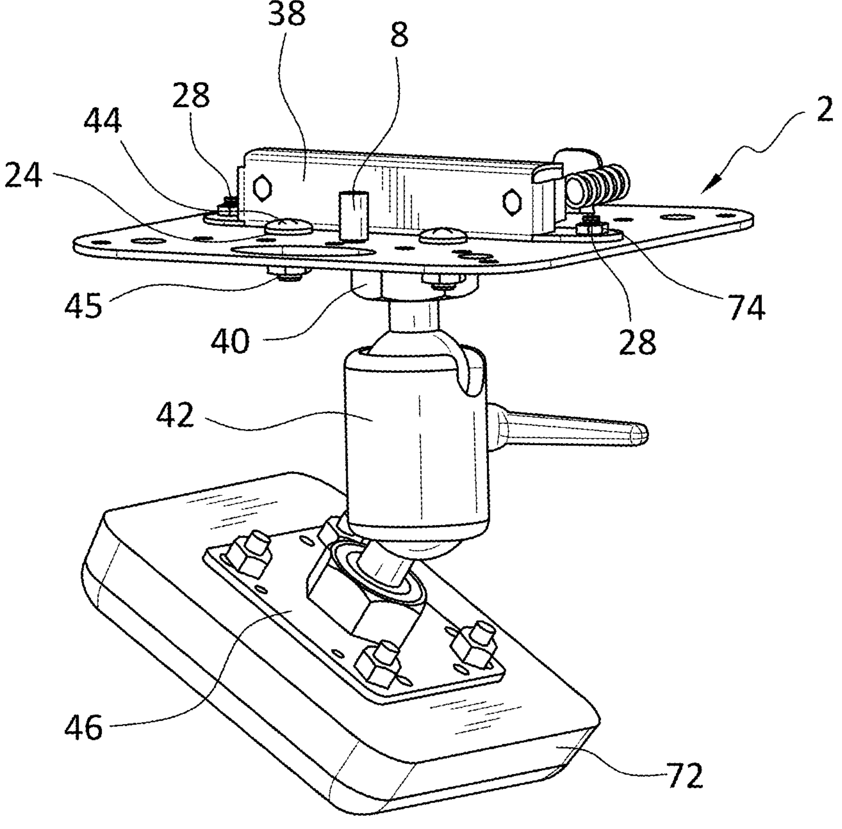
FIG. 13 is a perspective view of the mount shown in FIG. 7 attached to an antenna.

Referring to FIG. 13, a configuration is disclosed in which the user can deploy an articulated antenna 72 from the mount 2 while it is attached to a drop ceiling T-bar. By removing the mount's T-bar assembly 6 and its flat head screws, the T-bar bracket 38 disclosed above may be installed to the backplate 4 via screws and nuts 74 using the T-bar bracket pattern of holes 28. The T-bar bracket 38 allows the mount 2 to clip onto a drop ceiling T-bar. An accessory articulating mount 42 is attached to the mount backplate 4 via the accessory mount bracket 40, bolts 44 and nuts 45 and the hole patter of holes 24. The backplate 4 must be oriented so the pressed-in threaded stand 8 is facing the ceiling so that the articulating mount 42 and the accessory mount bracket 40 are on the opposite side of the backplate 4. Another accessory bracket 46 is located on the other end of the articulating mount 42 to accommodate the antenna 42. Antenna leads are routed through the cable pass through slots 26. By adjusting the accessory articulating mount 42, the user can aim the antenna 72 as desired.

Figure 14:
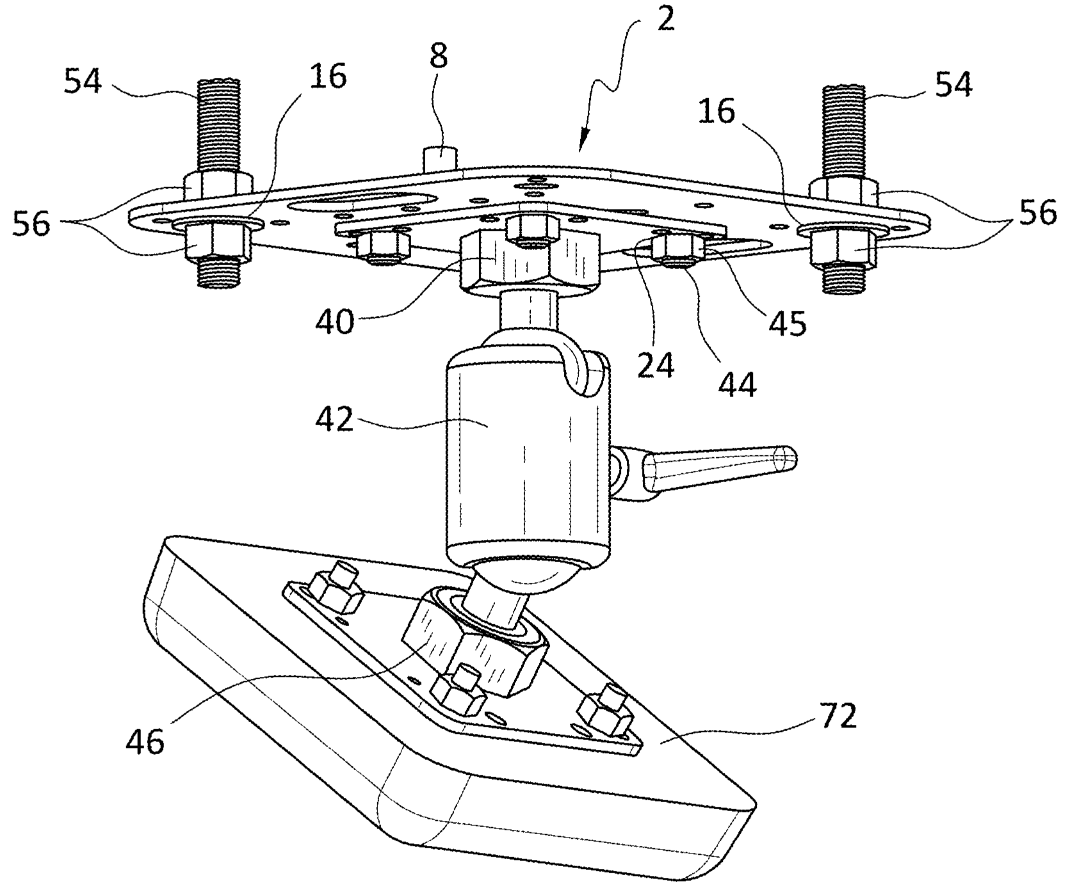
FIG. 14 is a perspective view of the mount shown in FIG. 7 attached to an antenna and hanging threaded rods.

Referring to FIG. 14, a configuration in which the user can deploy an articulating antenna 72 from the mount 2 while it is suspended from at least two lengths of all-thread rods 54. The mount backplate 4 contains four corner holes 16. Two lengths of threaded rods 54 can be inserted in a diagonal pair of the all-thread holes 16 and fastened with hex nuts 56. Alternatively, four lengths of threaded rods 54 can be used in all of the all-thread corner holes 16. The backplate 4 may also be attached to a building structure, such as the ceiling, wall, or electrical box, using an appropriate hole, after taking into account the standoff 8 and the screwheads of the bolts 44. An accessory articulating mount 42 is attached to the mount backplate 4 via the accessory mount bracket 40, bolts 44, and nuts 45. The backplate 4 must be oriented so the pressed-in threaded standoff 8 is facing the ceiling so the articulating mount 42 and bracket 40 are on the opposite side of the backplate. Another accessory bracket 46 is located on the other end of the articulating mount 42 to accommodate the antenna 72. Antenna leads are routed through the cable pass through slots 26. By adjusting the accessory articulating mount 42, the user can aim the antenna 72 as desired.

Figure 15:
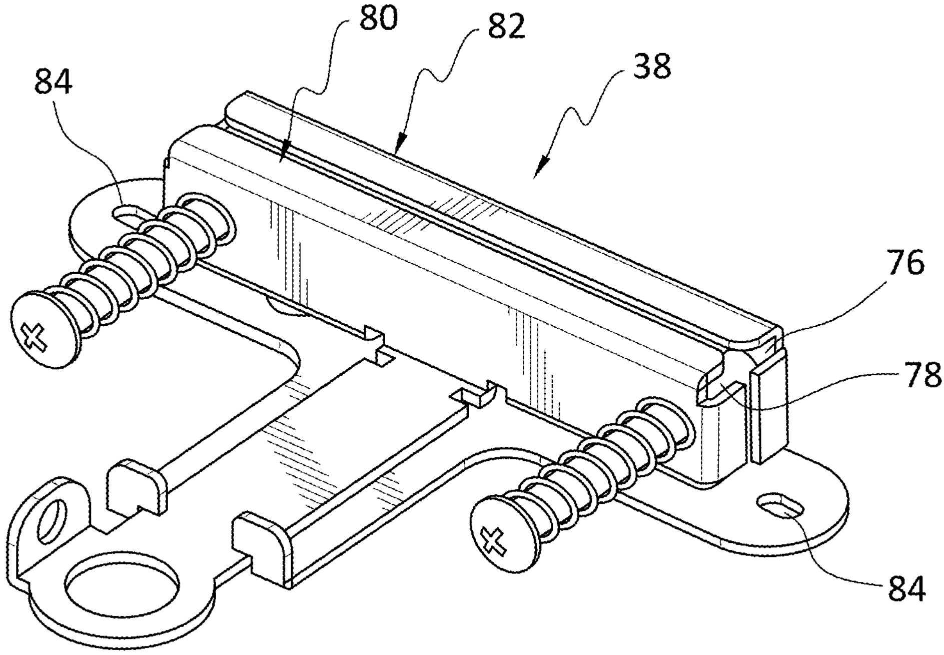
FIG. 15 is a perspective view of a T-bar bracket disclosed in U.S. Pat. No. 10,774,985.

Referring to FIG. 15, the T-bar bracket 38 referenced above with reference to U.S. Pat. No. 10,774,985 is shown. When the T-bar bracket 38 is used to attach the mount 2 to a ceiling T-bar, the slots 76 and 78 are configured to capture a portion of the ceiling T-bar. Mounting slots 84 align with the pattern of holes 28 in the backplate 4 for attaching the T-bar bracket 38 to the backplate 4, as shown in FIG. 13. When the T-bar bracket 38 is attached to the access point 36 as shown in FIGS. 4-5, the slots 76 and 78 are configured to capture the portion of the metal bar 32 between the enlarged ends 34 after retracting and releasing the movable jaw 80 from the fixed jaw 82, thereby preventing the metal bar 32 from slipping from out of the T-bar bracket 38. The mounting slots 84 are also used for attachment to the access point 36.

Figure 16:
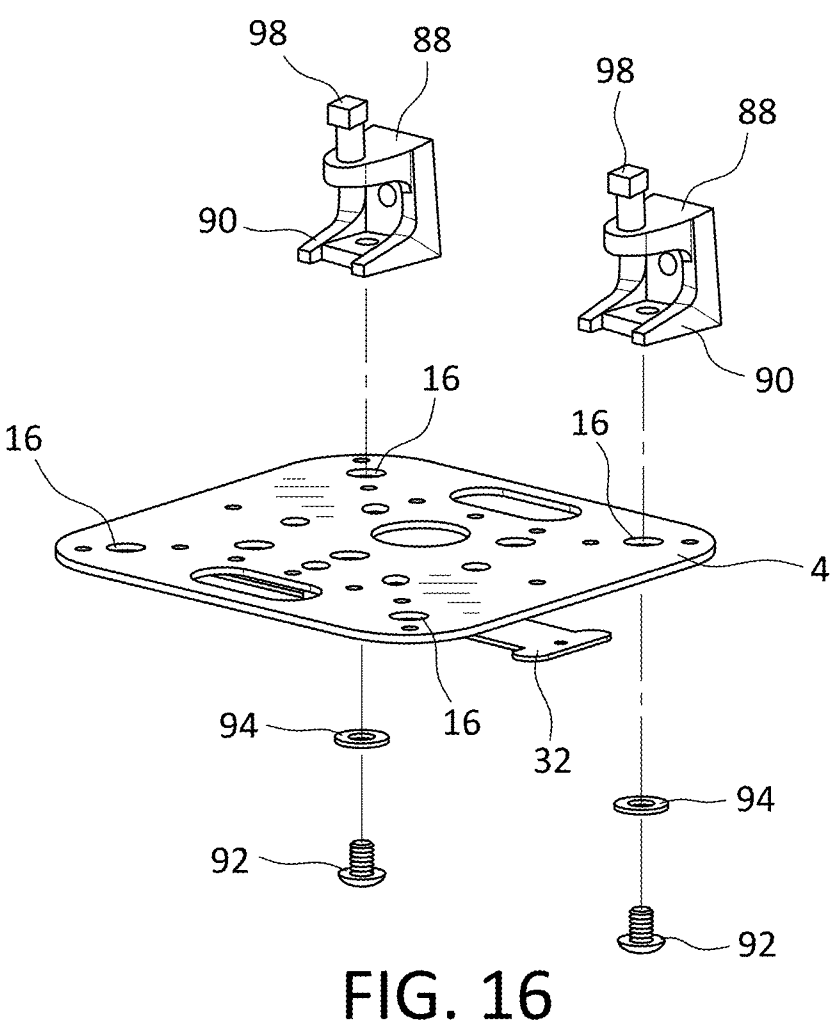
FIGS. 16-18 show the attachment of the mount to an I-beam.
Figure 17:
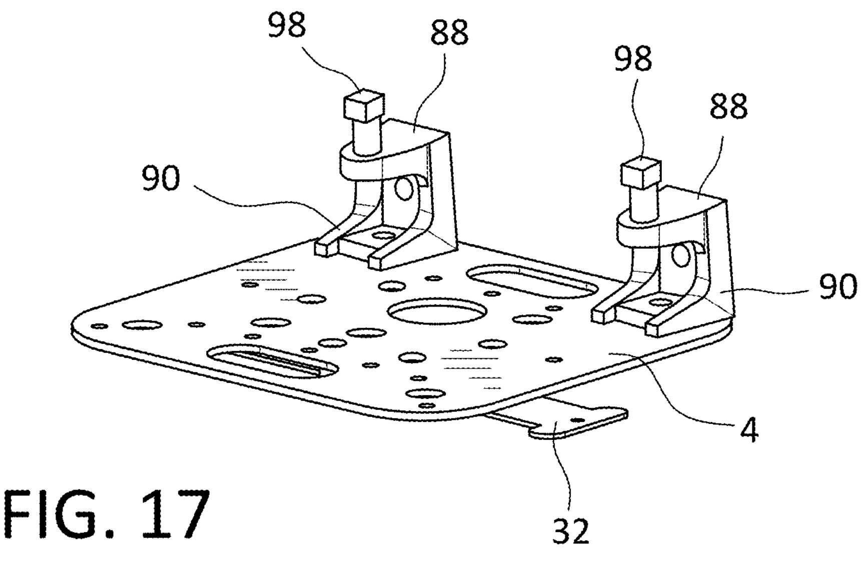
Figure 18:
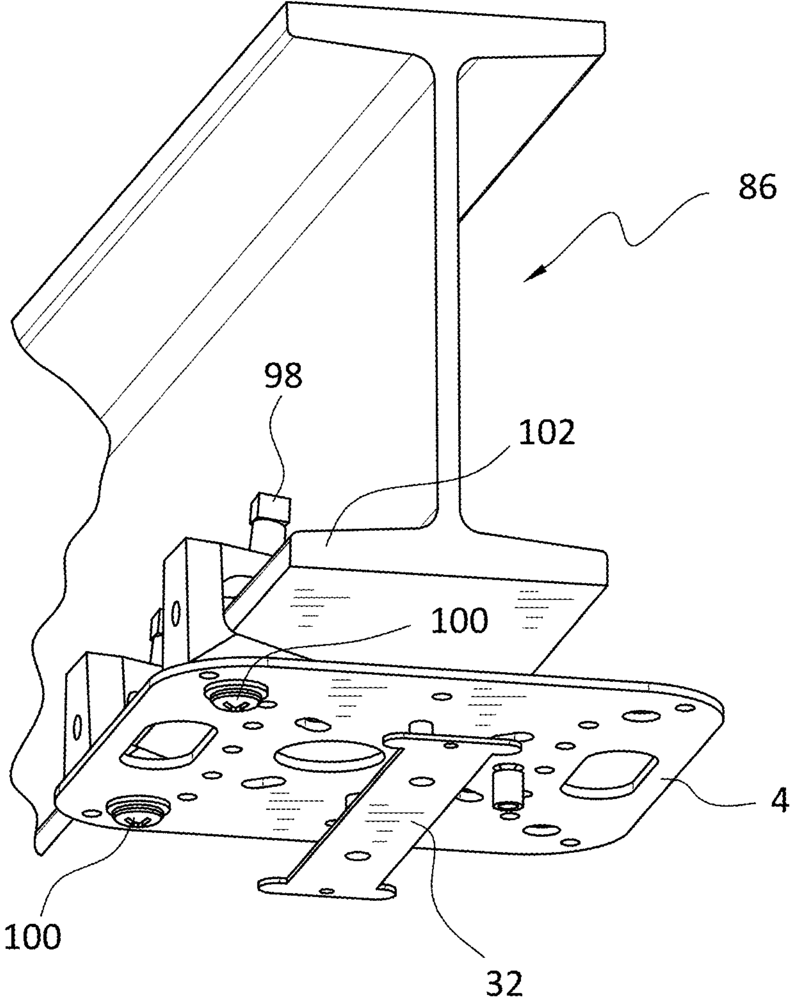

Referring to FIGS. 16-18, the backplate 4 may be attached to an exposed I-beam 86 typically found in some industrial locations such as warehouses. Exposed I-beam may be horizontal (such as in the ceiling) or vertical (such as columns that span from the floor to the ceiling). In these locations, the backplate 4 may be affixed to the I-beam 86 using off-the-shelf C-clamps 88. The fixed jaws 90 of the C-clamps are attached to the backplate 4 using two of the pattern of holes 16 with screws 92 and washers 94, sandwiching the backplate 4 between the screw heads 100 and the fixed jaws 90. The screws 92 are threaded to the fixed jaws 90. The C-clamps have screws 98 that are tightened against the flange 102 to draw the fixed jaws 90 against the flange 102 of the I-beam 86, thereby securing the backplate 4 to the I-beams 86.

The mount is advantageously compact and low profile (6"×6" footprint and 0.72" height without access point or the T-bar mounted), allowing it to blend into any environment, satisfying aesthetic preferences of all types of users. The Oberon product is 11.5"×11.5"×2" with a box-like appearance.

By mounting an access point only via T-bar assembly 2, less hole patterns are needed on the backplate, allowing for only hole patterns dedicated to mounting the mount in a variety of configurations. By only allowing a T-bar bracket type of mounting, mounting an access point is intuitive to a user. The "I" shape of the bar 32 prevents the access point's T-bar bracket from sliding off the ends.

In a wall mounted position, as shown in FIG. 4, an adjustable support provided by the screw 10 is provided to ensure that any access point tilt caused by any play between the T-bar bracket and T-bar assembly is eliminated.

The mount backplate 4 advantageously contains hole patterns that can accommodate several outlet and junction box types—and double gang, and 4"×4" junction box.

An accessory articulating mount 42 as shown in FIG. 7 can be added to the backplate of the mount 2, which allows a user to mount and control the orientation of their access point such as in the corners of rooms and on sloping ceilings.

The mount 2 can be reconfigured as a mount for articulating antennas, as shown in FIG. 13, in a location with a drop ceiling by attaching an accessory T-bar bracket 38.

The mount 2 can be reconfigured as a mount for articulating antennas in a location with at least two all-thread lengths and up to 4, as shown in FIG. 14.

The accessory hole pattern is also available for any accessory brackets that can be developed in the future as needs arise.

To use the mount, an access point is attached to a T-bar bracket 38 which is one of the most common methods of installing an access point to a drop ceiling. Many access points come supplied with a T-bar bracket or provided separately. Attaching an access point via a T-bar bracket 38 is a common method for attaching an access point to the mount. The T-bar assembly 6 of the mount is shown in FIG. 3. The 'I' shape of the metal bar 32 advantageously prevents an access point T-bar bracket 38 from sliding off the ends of the metal bar where it widens.

With a wide variety of hole patterns shown in FIG. 2, the mount will allow a user to mount in various ways to walls and ceilings which are the most common locations for access points to provide coverage to a location. Because of the various mounting methods, the mount is a viable solution in most locations.

The mount advantageously provides an aesthetically pleasing method of mounting an access point to a wall because of its compact size (6"×6" footprint). FIG. 6 shows an extreme case of a small (6.3"×6.3") access point being mounted and even then, most of the mount is not visible. To mount to a flat wall or ceiling, a user can simply fasten the mount 2 using screws in the holes located in the corners of the backplate 4, as shown in FIG. 6. The corner holes can also be used to suspend the mount from a ceiling using hanger wire.

In some locations ethernet cables are typically routed behind walls to junction and outlet boxes in the wall to hide and protect the cables. Users can attach the mount directly to the hole patterns of common electrical junction boxes and outlet boxes (both single and double gang) as seen in FIGS. 10, 11, and 12. Once the mount is secured to the wall, the user can pull the ethernet and/or power cables through conduit hole (seen in FIG. 2) and connect to the access point. The access point with its T-bar bracket (included with access point or supplied by the user) can then mount to the metal bar 32 on the mount 2, as shown in FIG. 4. There may be some play between the access point's T-bar bracket and the mount T-bar assembly, resulting in the access point slightly tilting toward the ground because of gravity. This can be remedied by installing a hex bolt in the standoff 8 that serves as an adjustable support. Because of the different heights of access point T-bar brackets, two bolt 10 of different lengths may be provided, as shown in FIG. 1, for two levels of adjustment. The user simply adjusts the bolt via hand or using a wrench causing the bolt to push the back of the access point parallel to the mount backplate, seen in FIG. 4.

Depending on the user's specific needs and location, they may desire to mount an access point from a ceiling. Similar to wall mounting, a user can opt to fasten the mount flat against a wall via the corner holes in the backplate as shown in FIG. 6. These corner holes can also be used for suspending the access point from the ceiling using hanger wire.

As seen in FIG. 9, a user can hang their universal mount and access point from a conduit by running the conduit through the appropriate hole located near the center of the mount backplate (FIGS. 2 and 9), and then fastening securely with locknuts. The ethernet and power cables are routed out of the conduit and can be connected to the access point.

The backplate of the mount has a hole located towards the center for passing threaded rod through the backplate. The mount can be securely fastened using hex nuts, as shown in FIG. 8. Ethernet and power cables can route through pass-through holes located in the backplate (shown in FIGS. 2 and 8). The access point is then attached and connected to the power and ethernet cables.

The backplate 4 of the mount has an accessory hole pattern which expands the functionality of the mount. It allows for the connection of both specialized mounting accessories to the back of the backplate, as well as accessories that can be developed in the future as special needs are identified. An example of accessory usage is connecting an articulating mount, such as shown in FIG. 7. The articulating mount and its accessory bracket attach to the mount backplate via screws, as shown in FIG. 7. This is particularly useful when the access point must be mounted in a position where the mount and the access point cannot be mounted flush and parallel to a wall or ceiling. One example is mounting to a sloping ceiling, but the user desires the access point to be aimed straight down to the floor. Another example is if a user wants to mount to a wall or ceiling but they need to position the access point in the corner of a room. In both examples, an articulating mounting gives the user the ability to aim the mount and access point as they require.

The mount can also be reconfigured to mount an individual articulating antenna instead of an access point in specific use cases. FIG. 13 shows a situation where an articulating antenna can be mounted from a drop ceiling T-bar using a T-bar bracket 38. The mount's T-bar assembly 6 is removed and the T-bar bracket 38 is installed via screws and nuts using the holes 28 of the mount and the slots 84 of the T-bar bracket 38.

The accessory articulating mount is installed via an accessory bracket attached to the backplate using the slotted holes 24 of the mount and an antenna attaches to an accessory bracket on the other end of the articulating mount. The antenna leads are routed through the cable pass through slots in the backplate. A user can then adjust the direction of the antenna as desired.

In FIG. 14, the mount is reconfigured to mount an articulating antenna from the backplate which is hanging from at least two lengths of all-thread. The backplate contains four holes for the all-thread rods where at least two (diagonal) and up to four can be used to pass all-thread through. The accessory articulating mount is installed via an accessory bracket attached to the backplate and an antenna attaches to an accessory bracket on the other end of the articulating mount. The antenna leads are routed through the cable pass through slots in the backplate. A user can then adjust the direction of the antenna as desired.

As can be seen above, the mount is advantageously universal as it is able to mount an access point or an articulable antenna in various mounting possibilities.

It should be understood that the various features shown in a particular combination in an embodiment of the mount are equally applicable and may be interchanged with the other features shown in another configuration of the mount to arrive at a different configuration even though not specifically disclosed in combination with the other embodiments.

While this invention has been described as having preferred design, it is understood that it is capable of further modifications, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

What is claimed is:

1. A mount for an access point, comprising:

a) a plate having a front side and a back side;

b) the plate including a number of patterns of holes for attaching the plate to a fixed structure; and c) a bar attached to the plate at a distance from the front side, the bar for attaching to an access point;

wherein a standoff extending from the front side of the plate;

wherein the plate includes a screw adjustably extendable from the front side to press a side of an access point attached to the bar away from the front side; and wherein the bar includes a longitudinal main portion and end portions wider than the main portion.

2. The mount as in claim 1, wherein the number of patterns of holes include a first pattern of holes, a second pattern of holes and a third pattern of holes for attaching the plate to a single gang outlet box, a double gang outlet box and a junction box, respectively.

3. The mount as in claim 1, wherein the number of patterns of holes include a first pattern of holes for attaching the plate to a hanging threaded rod.

4. The mount as in claim 1, wherein the number of patterns of holes include a hole for attaching the plate to a hanging conduit.

5. The mount as in claim 1, wherein the number of patterns of holes include a first pattern of holes for attaching an articulatable bracket.

6. The mount as in claim 1, wherein the number of patterns of holes include a first pattern of holes for attaching a C-clamp.

7. The mount as in claim 1, wherein some of the number of patterns of holes define a plurality of nesting rectangular perimeters.

8. The mount as in claim 1, wherein the bar is attached to the plate with standoffs secured to one of the number of patterns of holes.

9. A mount for an access point, comprising:

a plate having a front side and a back side;

the plate including a number of patterns of holes for attaching the plate to a fixed structure;

a bar attached to the plate at a distance from the front side, the bar for attaching to an access point; and wherein the bar includes a longitudinal main portion and end portions wider than the main portion;

wherein the bar is attached to the plate with standoffs secured to one of the number of patterns of holes; and wherein the plate includes a screw adjustably extendable from the front side to press a side of an access point attached to the bar away from the front side.

10. A mount for attaching an access point or antenna, comprising:

a) a plate having a first pattern of holes for attaching to an electrical junction box, and a second pattern of holes for attaching to an electrical double gang outlet box and a third pattern of holes for attaching to an electrical single gang outlet box; and b) the first pattern defining a first rectangular perimeter and the second and third patterns of holes defining respective second and third rectangular perimeters disposed within the first rectangular perimeter;

wherein a standoff extends from a front side of the plate;

wherein the plate includes a screw adjustably extendable from the front side to press a side of an access point attached to a bar away from the front side; and wherein the bar includes a longitudinal main portion and end portions wider than the main portion.

11. The mount as in claim 10, wherein the plate includes a fourth pattern of holes for attaching to a building wall or ceiling.

12. The mount as in claim 9, wherein the plate includes a fourth pattern of holes for attaching to a hanging rod.

13. The mount as in claim 9, wherein:

a) the plate includes a fourth pattern of holes; and b) a C-clamp attached to the plate with screws using the fourth pattern of holes, the C-clamp for attaching to an I-beam.

14. The mount as in claim 9, wherein:

a) the plate includes a fourth pattern of holes; and b) an articulatable bracket is attached to the plate with screws using the fourth pattern of holes.

15. The mount as in claim 14, wherein the articulatable bracket includes a body with a first swivel joint at one end and a second swivel joint at an opposite end, the first swivel joint for being operably attached to a wall or ceiling and the second swivel joint for being operably attached to the plate.

16. The mount as in claim 14, wherein the articulatable bracket includes a body with a first swivel joint at one end and a second swivel joint at an opposite end, the first swivel joint being operably attached to the plate and the second swivel joint being operably attached 5 to an antenna.

17. The mount as in claim 14, wherein:

a) the plate includes a fourth pattern of holes; and b) a T-bracket is attached to the plate with screws using the fourth pattern of holes, the T-bracket for attaching to a drop ceiling T-bar.

18. The mount as in claim 14, wherein:

a) the plate includes a fifth pattern of holes; and b) a bar is attached to the plate with screws using the fifth pattern of holes, the bar for being attached to an access point.

19. A mount for an access point, comprising:

a) a plate;

b) a bar attached to a front side of the plate, the bar being spaced away from the front side; and c) an articulatable mount attached to a back side of the plate, the articulatable mount including one end for being attached to a fixed structure;

wherein a standoff extending from the front side of the plate;

wherein the plate includes a screw adjustably extendable from the front side to press a side of an access point attached to the bar away from the front side; and wherein the bar includes a longitudinal main portion and end portions wider than the main portion.

20. The mount as in claim 1, wherein the standoff is disposed on a vertical centerline through the plate and below a horizontal centerline through the plate that is perpendicular to the vertical centerline, and wherein the standoff is a press-in threaded standoff.

* * * * *